| United States Patent Office | 3,055,904 |
|---|---|
| | Patented Sept. 25, 1962 |

3,055,904
NEW ISOINDOLINE DERIVATIVES
Wilfried Graf, Binningen, near Basel, and Erich Schmid and Willy G. Stoll, Basel, Switzerland, assignors to Geigy Chemical Corporation, Ardsley, N.Y., a corporation of Delaware
No Drawing. Filed Feb. 17, 1961, Ser. No. 89,924
Claims priority, application Switzerland Nov. 4, 1957
23 Claims. (Cl. 260—293.4)

The present invention concerns new isoindoline derivatives which have valuable pharmacological properties.

In one aspect of the invention it relates to isoindoline derivatives of the general Formula III

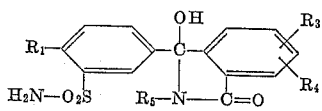

III wherein $R_1$ represents halogen (preferably chlorine or bromine), amino, lower alkyl or lower alkoxy radicals, $R_3$ represents hydrogen, chlorine, bromine, nitro, hydroxy, lower alkyl, lower alkoxy, carboxyl, lower carbalkoxy, carboxy-lower alkoxy, amino, lower alkanoylamino radicals, carbamyl radicals of the formula

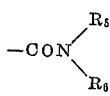

carbamyl-lower alkoxy radicals of the formula

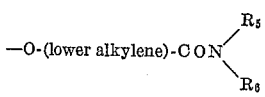

or sulphamyl radicals of the formula

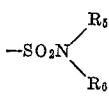

$R_4$ represents a member selected from the group consisting of hydrogen, chlorine, bromine, lower alkyl and lower alkoxy radicals, and $R_5$ as substituent at the nitrogen atom of the isoindoline ring means hydrogen, lower alkyl, lower alkenyl, lower hydroxyalkyl and cycloalkyl, and each of $R_5$ and $R_6$ taken separately as constituents of $R_3$ represents a member selected from the group consisting of hydrogen, a lower alkyl, lower alkenyl, lower hydroxyalkyl and $R_5$ and $R_6$ jointly and together with the corresponding nitrogen atom represent a member selected from the group consisting of pyrrolidino, piperidino and morpholino radicals.

In our copending application S.N. 795,616, filed February 26, 1959 (and abandoned since the filing of the present application) benzophenone sulphonamides of the general formula

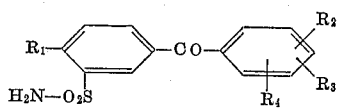

I wherein $R_1$ represents chlorine, bromine, amino, lower alkyl or lower alkoxy radicals, $R_2$ represents hydrogen, chlorine, bromine, carboxyl, lower alkyl, lower alkoxy, lower carbalkoxy, carboxy-lower alkoxy, carbamyl radicals of the formula

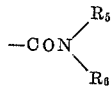

carbamyl-lower alkoxy radicals of the formula

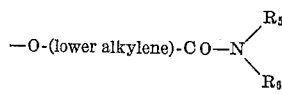

or sulphamyl radicals of the formula

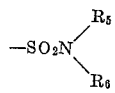

$R_3$ represents hydrogen, chlorine, bromine, nitro, hydroxy, lower alkyl, lower alkoxy, carboxyl, lower carbalkoxy, carboxy-lower alkoxy, amino, lower alkanoylamino radicals, carbamyl radicals of the formula

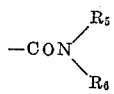

carbamyl-lower alkoxy radicals of the formula

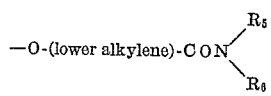

or sulphamyl radicals of the formula

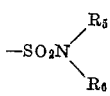

$R_4$ represents hydrogen, chlorine, bromine, lower alkyl or lower alkoxy radicals and each of $R_5$ and $R_6$ taken separately represents hydrogen, a lower alkyl, lower alkenyl or lower hydroxyalkyl, and $R_5$ and $R_6$ jointly and together with the corresponding nitrogen atom represent pyrrolidino, piperidino or morpholino radicals, are disclosed.

The compounds of Formula I defined above can be produced by reacting a benzophenone sulphonic acid derivative of the general formula

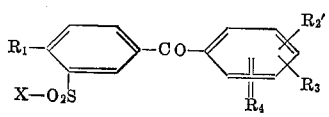

II wherein

X represents chlorine, bromine or an alkoxy group and
$R_2'$ represents a radical corresponding to the definition of $R_2$ or a chloro- or bromo-sulphonyl or chloro- or bromo-carbonyl radical, and
$R_1$, $R_3$ and $R_4$ have the meanings given above, with ammonia.

Starting materials of the general Formula II can be produced by various methods known per se. The 3-halogen sulphonyl group can be introduced into 4-substituted benzophenones to produce starting materials of the general Formula II for example by sulphonating and reacting the sulphonic acid obtained with a suitable mineral acid halide; it can be introduced direct by reacting with chlorosulphonic acid; or it can be introduced by nitrating, reducing the nitro group, diazotising the amino group obtained and decomposing the diazonium halide with sulphur dioxide in the presence of copper salts such as copper chloride. In such reactions, naturally the second phenyl radical often becomes substituted, or any substituents thereof which were already present are modified. For example a nitro group already present in the second phenyl radical can be converted simultaneously with the nitro group introduced into the 3-position, into a chlorosulphonyl radical. On reacting such starting products containing two chlorosulphonyl groups with ammonia, end products are obtained in which there are two unsubstituted sulphamyl groups.

Starting materials of the general Formula II for the production of end products having a substituted sulphonamide group $R_2$ can be obtained for example by modifying a nitro group already present in the second phenyl radical into a chlorosulphonyl group in the same way before the nitro group in the 3-position is introduced. The nitration can then be performed, then the chlorosulphonyl group of the second phenyl radical can be modified into a sulphamyl group substituted as defined by reacting with a suitable aliphatic amine and thereafter the nitro group in the 3-position can be converted in the manner described above into a chlorosulphonyl group. As amines which are suitable for the reaction with the chlorosulphonyl group of the second phenyl radical, may be named methylamine, ethylamine, isopropylamine, n-butylamine, allylamine, $\beta$-hydroxy-ethylamine, $\beta$-hydroxy-propylamine, dimethylamine, diethylamine, di-n-butylamine, diallylamine and bis-($\beta$-hydroxy-ethyl)-amine, pyrrolidine, piperidine and morpholine.

In particular, starting materials for compounds having two unsubstituted sulphamyl groups can be obtained for example by treating suitably substituted benzophenones with chlorosulphonic acid to introduce a halogen sulphonyl group into each of the 3- and 3'-positions, or by first sulphonating or nitrating such benzophenones in these two positions and converting the substituted benzophenone-3.3'-disulphonic acids or substituted 3.3'-dinitrobenzophenones obtained by methods given above into substituted 3.3'-bis-chlorosulphonyl benzophenones.

A further valuable group of starting materials are obtained if halogen or alkyl benzenes are reacted according to Friedel-Crafts with possibly substituted phthalic acid anhydrides, the 4-halogen- or 4-alkyl-2'-carboxybenzophenones obtained are nitrated and the 4-substituted 3-nitro-2'-carboxybenzophenones are converted by methods given above into 4-substituted 3-chlorosulphonyl-2'-carboxybenzophenones or into 4-substituted 3-chlorosulphonyl-2'-chlorocarbonylbenzophenones.

Numerous variations in the substitution of the second phenyl radical as well as in the production of starting materials in which this radical is unsubstituted, are enabled by the condensation of 4-substituted 3-nitro benzoic acid halides with benzene which can possibly be substituted according to the definitions for $R_2$, $R_3$ and $R_4$.

The ways described above by no means exhaust the possibilities for the production of suitable starting materials of the general Formula II by methods known per se. The following compounds are given as examples of starting materials:

4-chloro-benzophenone-3-sulphochloride and -3-sulphobromide,
4-chloro-4'-methyl-benzophenone-3-sulphochloride,
4-chloro-2'.4'-dimethyl-benzophenone-3-sulphochloride,
4-chloro-2'-carboxy-benzophenone-3-sulphochloride,
4-chloro-2'-carbethoxy-benzophenone-3-sulphochloride,
4-chloro-2'-carbethoxy-benzophenone-3-sulphonic acid ethyl ester,
4-methyl-2'-chlorocarbonyl-benzophenone-3-sulphochloride,
4-chloro-4'-nitro-benzophenone-3-sulphochloride,
4-isopropyl-benzophenone-3-sulphochloride,
4-chloro-4'-sulphamyl-benzophenone-3-sulphochloride,
4-chloro-benzophenone-3.4'-disulphochloride,
4-bromo-benzophenone-3.4'-disulphochloride,
4-methyl-benzophenone-3.4'-disulphochloride,
4.4'-dichloro-benzophenone-3.3'-disulphochloride,
4.4'-dimethoxy-benzophenone-3.3'-disulphochloride,
4-isopropoxy-4'-methyl-benzophenone-3.3'-disulphochloride,
4-chloro-4'-aminobenzophenone-3.3'-disulphochloride,
4-chloro-2'.4'-dimethyl benzophenone-3.5'-disulphochloride, and
4-chloro-3'.4'-dichloro-benzophenone-3-sulphochloride.

Compounds of the general Formula I can be used as intermediate products. In particular, compounds of this general formula in which $R_3$ is a nitro group or $R_3$ and/or $R_1$ are amino groups, or $R_2$ and/or $R_3$ are methyl groups, can be converted into other compounds which correspond to the general Formula I. For example, compounds of the general Formula I in which $R_3$ represents a nitro group whilst $R_1$, $R_2$ and $R_4$ have the meanings given above, can be reduced to compounds having an amino group as $R_3$. Such compounds as well as those having an amino group $R_1$ can be converted into diazonium salts which can be further reacted according to the various known methods. Examples of such reactions are the conversion of the diazonium halides into corresponding halogen compounds ($R_3$ and/or $R_1$=halogen, in particular chlorine) or into cyano compounds by treatment of their solutions with cuprohalide, copper powder or potassium cuprocyanide, the decomposition of diazonium salts, e.g. of sulphates, with water or diluted mineral acids to form the corresponding hydroxyl compounds ($R_3$=OH) or with low molecular alkanols to form alkoxy compounds ($R_3$ and/or $R_1$=alkoxy groups); the replacement of the diazonium group by hydrogen by treatment of the diazonium salts with aqueous sodium hypophosphite solution, with formic acid, formamide, dimethyl formamide or with an alcohol.

All the above conversion products, with the exception of the cyano compounds, still fall under the general Formula I. Also, compounds again corresponding to the general Formula I with a carbamyl or carboxyl group as $R_3$ or $R_2$ are obtained by partial or complete hydrolysis of the cyano compounds. In addition, suitable diazonium chlorides can be converted analogously to the production of starting materials of the general Formula II on treatment with sulphur dioxide into sulphochlorides and these latter can be reacted with ammonia or suitable aliphatic amines, i.e. low molecular mono- and di-alkylamines, monoalkanolamines, dialkanolamines or N-alkylalkanolamines to form compounds which possibly have a substituted sulphamyl group $R_2$. Finally, for example compounds in which $R_2$ and/or $R_3$ is/are (a) methyl group(s) and in which $R_1$ is advantageously a halogen atom can be oxidised, for example with potassium permanganate solutions, to form corresponding compounds having one or two carboxyl groups and then, if desired, one of the two carboxyl groups can be split off by heating.

In addition, compounds with an amino group $R_3$ can be converted by reaction with low molecular fatty acids or reactive functional derivatives thereof into compounds with one low molecular alkanoylamino group $R_3$.

Following the above processes, and as exemplified in our copending application S.N. 795,616, there has been prepared 4-chloro-benzophenone-3.4'-disulphonamide, M.P. 201–202°,
4-chloro-2'-carboxy-benzophenone-3-sulphonamide, M.P. 223°,
4-methyl-benzophenone-3,4'-disulphonamide, M.P. 114°,
4-chloro-benzophenone-3.3'-disulphonamide, M.P. 236°,
4-bromo-benzophenone-3.4'-disulphonamide, M.P. 229.5°,
4-methyl-2'-carboxy-benzophenone-3-sulphonamide, M.P. 202°,
4.4'-dichloro-benzophenone-3.3'-disulphonamide, M.P. 237°,
4.4'-dibromo-benzophenone-3.3'-disulphonamide, M.P. 240°, 4.4'-difluoro-benzophenone-3.3'-disulphonamide,
4.4'-dimethoxy-benzophenone-3.3'-disulphonamide, M.P. 292°,
4-chloro-4'-methyl-benzophenone-3-sulphonamide, M.P. 167–168.5°,
4-chloro-2'.4'-dimethyl benzophenone-3-sulphonamide, M.P. 173–175°,
4-chloro-3'.4'-dimethyl-benzophenone-3-sulphonamide, M.P. 185°,
4-chloro-4'-methyl-benzophenone-3.3'-disulphonamide, M.P. 216–219°,
4-chloro-4'.6'-dimethyl-benzophenone-3.3'-disulphonamide, M.P. 222.5–225°,
4-chloro-4'-methoxy-benzophenone-3-sulphonamide, M.P. 161°,
4-chloro-4'-ethoxy-benzophenone-3-sulphonamide, M.P. 161°,
4-chloro-3'-methyl-4'-n-propoxy-benzophenone-3-sulphonamide, M.P. 186°,
4-chloro-2'-carbomethyloxy-benzophenone-3-sulphonamide, M.P. 178.5–182°,
4-chloro-2'-carbethoxy-benzophenone-3-sulphonamide, M.P. 150.5–153°,
4-chloro-2'-carbamylmethoxy-benzophenone-3-sulphonamide,
4-amino-2'-carbamylmethoxy-benzophenone-3-sulphonamide,
4-chloro-2'-(diethylcarbamyl-methoxy)-benzophenone-3-sulphonamide,
4-chloro-2'-(diallylcarbamyl-methoxy)-benzophenone-3-sulphonamide,
4-chloro-4'-carbamyl-benzophenone-3-sulphonamide, M.P. 244–247°,
4-chloro-4'-carboxymethoxy-benzophenone-3-sulphonamide, M.P. 191–193.5°',
4-chloro-4'-carbamylmethoxy-benzophenone-3-sulphonamide, M.P. 233–237° (on decomposition),
4-chloro-4'-(dimethylcarbamyl-methoxy)-benzophenone-3-sulphonamide, M.P. 144.5–147°,
4-chloro-4'-(β-carbamyl-ethoxy)-benzophenone-3-sulphonamide,
4-chloro-4'-(β-diethylcarbamyl-ethoxy)-benzophenone-3-sulphonamide,
4-chloro-2'.4'.6'-trimethyl-benzophenone-3-sulphonamide, M.P. 169°,
4-chloro-3'-nitro-benzophenone-3-sulphonamide, M.P. 189–191°,
4-chloro-3'-amino-benzophenone-3-sulphonamide, M.P. 175–176°,
4-chloro-3'-acetamido-benzophenone-3-sulphonamide, M.P. 231–232°,
4-chloro-3'-nitro-4'-methyl-benzophenone-3-sulphonamide M.P. 195–199°,
4-chloro-3'-nitro-4'.6'-dimethyl-benzophenone-3-sulphonamide M.P. 193–197°,
4-chloro-3'-amino-4'.6'-dimethyl-benzophenone-3-sulphonamide M.P. 168–170°,
4-chloro-3'-acetamido-4'.6'-dimethyl-benzophenone-3-sulphonamide, M.P. 218.5–220.5°,
4-chloro-3'-hydroxy-benzophenone-3-sulphonamide, M.P. 133°,
4-chloro-3'-ethyl sulphamyl-benzophenone-3-sulphonamide, M.P. 213°,
4-chloro-3'-diethylsulphamyl-benzophenone-3-sulphonamide, M.P. 163°,
3-sulphamyl-4-chloro-benzophenone-3'-sulphonic acid piperidide,
3-sulphamyl-4-chloro-benzophenone-3'-sulphonic acid morpholide,
4-chloro-3'-(β-hydroxyethylsulphamyl)-benzophenone-3-sulphonamide, M.P. 149°,
4-chloro-2'-diethylcarbamyl-benzophenone-3-sulphonamide, M.P. 2020–204°, and
4-chloro-2'-dimethylcarbamyl-benzophenone-3-sulphonamide, M.P. 173–175°.

Compounds of the general Formula I have excellent diuretic activity, i.e. they can be used to promote the excretion of water and sodium chloride that have accumulated in excess in the interstitial tissues or serous cavities. In this respect the ratio of ions excreted is very favourable for therapeutical purposes in that, for example, the amount of potassium excreted is slight compared with that of sodium and, on the other hand, the great amount of sodium eliminated is accompanied by a considerable increase in the amount of chlorine and water eliminated. Some of the compounds defined above are suitable also as intermediate products for the production of other diuretic substances.

Now and according to the first aspect of this invention it has been found and determined by spectroscopic measurements that if in the compounds of general formula I $R_2$ is a carbamyl group in o-position of the ring-connecting carbonyl group and contains at least one hydrogen bound to the amide nitrogen, then in the process of production of such compounds of the general Formula I as described above, a tautomeric rearrangement occurs and the end product in fact corresponds to the general Formula III, which is a cyclic tautomeric structure of such Formula I type compounds wherein $R_2$ in Formula I is the substituent

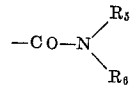

in o-position of the ring-connecting CO-group, whereby $R_6$ means hydrogen and $R_5$ means hydrogen or a low molecular aliphatic radical which may be a saturated or unsaturated straight chain and branched chain radical, especially a lower alkyl radical, such as methyl, ethyl, propyl, butyl or a hydroxyalkyl radical such as 2-hydroxyethyl or 3-hydroxypropyl, or a lower alkenyl radical, or a cycloalkyl radical such as cyclopentyl or cyclohexyl.

The tautomeric compounds of this general Formula III are 1-oxo-3-(3'-sulphamyl-4'-substituted-phenyl)-3-hydroxy-isoindolines.

Although it is not wanted to connect the invention with any theory, it is supposed that when starting materials of the general formula

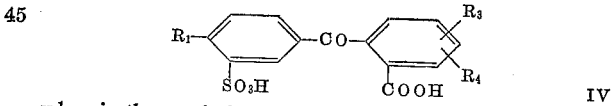   IV wherein the symbols $R_1$, $R_3$, and $R_4$ represent substituents as defined above, are treated, e.g. with thionyl chloride or phosphorus pentahalides to transform the acid groups into the corresponding sulphonyl halide and carbonyl halide groups, a rearrangement to the corresponding halolactone (ring-substituted 3-phenyl-3-halophthalide) of the general Formula V takes place,

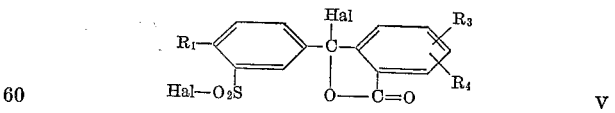   V wherein $R_1$, $R_3$ and $R_4$ have the meanings given above and Hal is chlorine or bromine.

These compounds readily reaction with excess ammonia or successively first with a saturated organic amine under mild conditions and then with excess ammonia to form compounds of the general Formula III.

Compounds of general Formula III are very valuable diuretics, especially, if in FORMULA III, $R_1$ is chlorine, $R_3$ and $R_4$ are hydrogen and $R_6$ is hydrogen or alkyl.

The compounds of the general Formula III as well as compounds of the general Formula I are distinguished not only by great diuretic activity but also by their very slight toxicity and thus a very favourable therapeutical index. They can be administered for example for the treatment of digestive heart failure and other ailments accompanied by water retention in dosages of 50–200 mg. once to three times daily, i.e. in all, 50–600 mg. daily, per os, but in many cases, 100 m. given very second day are sufficient.

The following examples illustrate production of the new isoindoline derivatives of general Formula III without limiting this aspect of the invention in any way. Parts are given as parts by weight and their relationship to parts by volume is as that of grammes to cubic centimetres. The temperatures are in degrees centigrade.

*Example 1*

15 parts of aqueous 46% sodium nitrite solution are gradually added to a mixture of 27.5 parts of 4-chloro-3-amino-benzophenone-2'-carboxylic acid, 200 parts of glacial acetic acid and 20 parts of 37% hydrochloric acid at 0–10°. The solution of the diazonium salt is poured into an ice-cooled mixture of 200 parts of 30% sulphur dioxide solution in glacial acetic acid and 3 parts of crystallised cupric chloride in 15 parts of water. Nitrogen is developed and, after a short time, the 4-chloro-2'-carboxy-benzophenone-3-sulphochloride crystallises out. After 1 hour it is filtered off and washed with water. M.P. 178–182°.

35.9 parts of 4-chloro-2'-carboxy-benzophenone-3-sulphochloride and 50 parts of thionyl chloride are heated first for 3 hours at 30–35° and then for 1 hour at 45°. The excess thionyl chloride is distilled off in the vacuum, the dichloride, 3-chloro-3-(3'-chlorosulphonyl-4'-chlorophenyl)phthalide, which remains as a crystallised mass is dissolved in 150 parts of chloroform and a mixture of 200 parts of 25% aqueous ammonia solution and 200 parts of ethanol is added dropwise at about 10° while stirring and cooling. After stirring for 1 hour at 40°, the solvent is distilled off in the vacuum and diluted hydrochloric acid is added to the residue whereupon the 1-oxo-3-(3'-sulphamyl - 4' - chloro-phenyl) - 3 - hydroxy-isoindoline of the structure

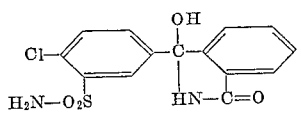

which is tautomeric to the 4-chloro-2'-carbamyl-benzophenone-3-sulphonamide, separates out. On recrystallising from diluted ethanol, the isoindoline derivative melts at 215° on decomposition.

Instead of reacting the dichloride in aqueous solution with ammonia, it can also be reacted at −50 to −40° with a great excess of liquid ammonia. After removal of the ammonia, the crude product obtained is recystalised as described above.

If in the foregoing example 4-chloro-4'-carboxy-benzophenone-3-sulphochloride is substituted for 4-chloro-2'-carboxy-benzophenone-3-sulphochloride, then 4-chloro-4'-carbamyl-benzophenone-3-sulphonamide, rather than the corresponding tautomeric 1-oxo-3-(3'-sulphamyl-4'-chloro-phenyl)-3-hydroxy-isoindoline, results.

*Example 2*

20 parts of 3 - chloro - 3 - (3' - sulphamyl - 4' - chlorophenyl)phthalide, obtained by heating 4-chloro-3-sulphamyl-benzophenone-2'-carboxylic acid with excess thionyl chloride for 1 hour and distilling off the unused thionyl chloride, are pulverised and added at 0–10° while cooling well to 30 parts of n-butylamine, whereupon a strong exothermic reaction occurs. The mixture is stirred for another 15 minutes, it is then heated to 40° and at this temperature the volatile components are removed in a vacuum. The residue is dissolved in 100 parts of warm 2 N-caustic soda lye and the reaction product is precipitated by the addition of solid ammonium sulphate. The crystals obtained are filtered off under suction and purified by recrystallisation from aqueous alcohol and then from 50% acetic acid.

The pure 1-oxo-2-n-butyl-3-(3'-sulphamyl - 4' - chlorophenyl)-3-hydroxy-isoindoline melts at 221.5–224° on decomposition.

The following compounds are obtained in an analogous manner:

1-oxo-2-methyl-3-(3'-sulphamyl-4'-chloro-phenyl)-3-hydroxy-isoindoline, M.P. 232–234° on decomposition,
1-oxo-2-ethyl-3-(3'-sulphamyl-4'-chloro-phenyl)-3-hydroxy-isoindoline, M.P. 216.5–219° on decomposition, and
1-oxo-2-cyclohexyl-3-(3'-sulphamyl-4'-chloro-phenyl)-3-hydroxy-isoindoline, M.P. 187–190° (after recrystallisation from 50% acetic acid).

If in Example 2, a secondary amine is employed in place of the primary amine then the corresponding sulphonamide is obtained rather than the isoindoline, e.g. substituting diethylamine for n-butylamine results in the production of 4-chloro-2'-diethyl carbamyl-benzophenone-3-sulphonamide rather than 1-oxo-2-n-butyl-3-(3'-sulphamyl-4'-chlorophenyl)-3-hydroxy-isoindoline.

In a second aspect of the invention, it relates to isoindoline derivatives of the general formula

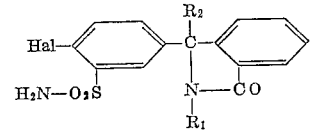   VI wherein Hal represents chlorine, $R_1$ is hydrogen or a lower alkyl radical, and $R_2$ is an alkoxy group with 1–6 carbon atoms, a lower alkylamino group, a lower dialkylamino group, a lower dialkylaminoalkylamino group or the piperidino radicals. Compounds of general Formula VI have excellent diuretic and saluretic activity and also reduce blood pressure. The proportional amounts of ions excreted is very favourable as the amount of potassium ions excreted is very slight compared to that of sodium ions. On the other hand, a great excretion of chlorine ions and of water corresponds to the strong excretion of sodium ions. Particularly preferred isoindolines of the general Formula VI are those in which Hal represents chlorine, $R_1$ is hydrogen and $R_2$ is the methoxy or the ethoxy group.

To produce the compounds defined above, a 1-oxo-3-aryl-3-hydroxy-isoindoline of the general formula

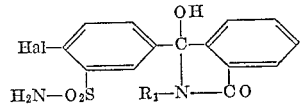   VII wherein $R_1$ and Hal have the meanings given above, is reacted either direct or after treatment with an inorganic acid chloride or bromide to convert it into a 1-oxo-3-aryl-3-halogen isoindoline of the general formula

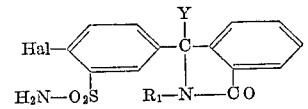   VIII wherein Y represents chlorine or bromine, with a compound of the general formula

   IX wherein $R_2$ has the meaning given above, the reaction being performed in the presence of an agent splitting off water or an acid binding agent if necessary.

Compounds of the general Formula VII are easily reacted with compounds of the general Formula IX. An excess of compounds of the general Formula IX or an inert organic solvent can serve as reaction medium. Hydrogen chloride has proved to be a good agent splitting off water in reaction with alcohols but at temperatures above about 80° its use is not absolutely indispensable.

Starting materials of the general Formula VII are converted most simply into those of general Formula VIII with the aid of thionyl chloride which is easily removed but also other inorganic acid halides such as, e.g. phosphorus pentachloride or phosphorus tribromide can be used. Both this conversion and also the following reaction with compounds of the general Formula IX can even be performed at room temperature. They are exothermic reactions. If desired, an excess of the amine to be reacted or of another base such as pyridine, trimethylamine or potassium carbonate can serve as acid binding agent. In reactions with alcohols of the general Formula IX, the presence of an acid binding agent is also not indispensable, sometimes less reactive alcohols can be reacted before the main reaction with suitable acid binding agents to form metal compounds.

Starting materials of the general Formula VII are obtained, for example, by reacting compounds of the general formula

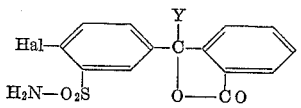

X with amines of the general formula $$R_1—NH_2 \qquad XI$$

or by reacting compounds of the general formula

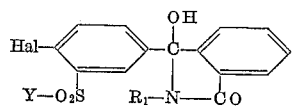

XII with ammonia, advantageously in the presence of acid binding agents, e.g. excess amine or ammonia.

However, starting materials in which $R_1$ is hydrogen, can also be produced with advantage by reacting compounds of the general formula

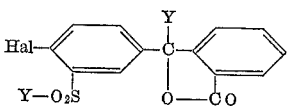

XIII with excess ammonia. In the above general Formulae X, XI, XII and XIII, $R_1$, Hal and Y have the meanings given above.

The compounds of the general Formulae X, XII and XIII can be produced in their turn, for example, on the one hand starting from halogen benzenes and on the other from phthalic acid anhydride or phthalic acid ester halides. By condensing such reaction components according to Friedel-Crafts, 4'-halogen-2-carboxybenzophenones or -2-carbalkoxybenzophenones are obtained which can be nitrated in the 3'-position. On reducing the 4'-substituted 3'-nitro-2-carboxybenzophenones, diazotising the 3'-amino compounds obtained and decomposing the diazonium halides with sulphur dioxide in the presence of copper salts such as cupric chloride or cupric bromide, substituted 3'-halogen sulphonyl-2-carboxybenzophenones are obtained which can be reacted with ammonia to form corresponding 3'-sulphamyl compounds. These can be converted by treatment with mineral acid halides into sulphamyl-substituted halogen lactones of the general Formula X. However, the 3'-halogen sulphonyl compounds mentioned above can also be converted by treatment with mineral acid halides into halogen sulphonyl-substituted halogen lactones of the general Formula XIII. Finally, starting materials of the general Formula XII are obtained by nitrating 1-oxo-3-(p-halogenphenyl)-3-hydroxy-isoindolines, reducing the nitration products, diazotising the amino compounds and treating the diazonium chlorides with sulphur dioxide in the presence of copper chloride.

The following compounds are given as examples of starting materials of the general Formula VII:

1 - oxo - 3 - (3' - sulphamyl - 4' - chlorophenyl) - 3-hydroxy-isoindoline, M.P. 215° on decomposition;

1 - oxo - 2 - methyl - 3 - (3' - sulphamyl - 4' - chlorophenyl)-3-hydroxy-isoindoline, M.P. 232–234° on decomposition;

1 - oxo - 2 - ethyl - 3 - (3' - sulphamyl - 4' -chlorophenyl)-3-hydroxy-isoindoline, M.P. 216.5–219° on decomposition;

1 -oxo - 2 - n - butyl - 3 - (3' - sulphamyl - 4' - chlorophenyl)-3-hydroxy-isoindoline, M.P. 221.5–224° on decomposition.

Examples of starting materials of the general Formula IX are alcohols such as, e.g. methanol, ethanol, n-propanol, isopropanol, n-butanol, isobutanol, sec. butanol, n-amyl alcohol, isoamyl alcohol, n-hexanol; primary and secondary amines such as methylamine, ethylamine, n-propylamine, isopropylamine, n-butylamine, isobutylamine, isoamylamine, n-hexylamine or dimethylamine, diethylamine, di-n-propylamine, di-n-butylamine, N-methyl-n-butylamine, piperidine and also dialkylaminoalkyl-amines such as N.N-dimethylethylenediamine, N.N-diethylethylenediamine and γ-dimethylaminopropylamine.

The compounds of Formula VI according to the present invention have good solubility in lipoids, only slight toxicity, a long-lasting action and good tolerance. They can be used, for example, for the treatment of oedema of any origin such as of cardiac, hepatic, renal, static or trophic origin in man, and are administered orally in dosages of 0.5 mg./kg. to 20 mg./kg.

The following examples further illustrate the production of the compounds of general Formula VI without limiting this second aspect of the invention in any way. Parts are given therein as parts by weight and their relationship to parts by volume is as that of grammes to cubic centimetres. The temperatures are in degrees centigrade.

*Example 3*

34 parts of 1-oxo-3-(3'-sulphamyl-4'-chlorophenyl)-3-hydroxy-isoindoline are refluxed for 30 minutes with a solution of 2 parts of hydrogen chloride in 170 parts of methanol and then the reaction mixture is evaporated to dryness in the vacuum. The crude 1-oxo-3-(3'-sulphamyl-4'-chlorophenyl)-3-methoxy-isoindoline so obtained is recrystallised first from methanol and then from benzene; M.P. 200–202°.

1 - oxo - 3 - (3' - sulphamyl - 4' -chlorophenyl) - 3-ethoxy-isoindoline, M.P. 120–124° (hydrate, from alcohol) is produced likewise with ethanol containing hydrogen chloride.

On boiling the starting material with n-butanol, 1-oxo-3 -(3' - sulphamyl - 4' - chlorophenyl) - 3 - n - butoxy-isoindoline is formed even when no hydrochloride is present (M.P. 183–185°).

*Example 4*

37 parts of 1-oxo-2-ethyl-3-(3'-sulphamyl-4'-chlorophenyl)-3-hydroxy-isoindoline are suspended in 160 parts by volume of thionyl chloride at 20°. A complete solution is obtained within 20 minutes. The excess thionyl chloride is then evaporated off in the vacuum and then 44 parts of 1-oxo-2-ethyl-3-(3'-sulphamyl-4'-chlorophenyl)-3-chloro-isoindoline are obtained as a yellowish hydroscopic powder.

This is added in portions at 0–10° to a mixture of 90 parts by volume of ethanol and 90 parts by volume of ether. From the solution which was originally clear, 1-oxo-2-ethyl-3-(3'-sulphamyl-4'-chlorophenyl)-3 - ethoxy-isoindoline crystallises out after a short time, M.P. 214–217°.

The corresponding 3-hexyloxy compounds is obtained with n-hexanol; (yellowish, amorphous).

In a similar manner, 1-oxo-3-(3'-sulphamyl-4'-chlorophenyl)-3-ethoxy-isoindoline is obtained from 1-oxo-3-

(3'-sulphamyl-4'-chlorophenyl) - 3 - hydroxy-isoindoline. Because of the difficult solubility of the starting substance, in this case the reaction time of the thionyl chloride is advantageously increased to 10–30 hours.

Example 5

34 parts of 1-oxo-3-(3'-sulphamyl-4'-chlorophenyl)-3-hydroxy-isoindoline are suspended in 250 parts of thionyl chloride and the mixture is stirred for 20 hours at 20–25°. The excess thionyl chloride is then distilled off in the vacuum and the crude 3-chloro compound which remains is gradually poured into an ice-cold mixture of 60 parts by volume of piperidine and 40 parts by volume of benzene. The solution formed is evaporated to dryness in the vacuum.

To remove the piperidine hydrochloride, the residue is washed with ice water, filtered and dried in a high vacuum. In this way, 1-oxo-3-(3'-sulphamyl-4'-chlorophenyl)-3-piperidino-isoindoline is obtained, M.P. 236° on decomposition (from dioxan).

In the same way, but using n-propylamine instead of piperidine, 1-oxo-3-(3'-sulphamyl-4'-chlorophenyl)-3-n-propylamino-isoindoline is obtained, M.P. 231–233° on decomposition (from a mixture of dioxan/benzene).

Example 6

The 1-oxo-2-ethyl-3-(3'-sulphamyl-4'-chlorophenyl(-3-chloro-isoindoline described in Example 4 is added at 0–10° to a mixture of 120 parts of n-butylamine and 90 parts by volume of benzene. A pale yellow solution is formed which is then evaporated to dryness in the vacuum. The residue is washed with water, dried over sulphuric acid and recrystallised from dioxan. In this way, 1-oxo-2-ethyl-3-(3'-sulphamyl-4'-chlorophenyl)-3-n-butylamino-isoindoline is obtained, M.P. 148°.

On using diethylamine instead of n-butylamine and otherwise the same procedure, 1-oxo-2-ethyl-3-(3'-sulphamyl-4'-chlorophenyl)-3-diethylamino-isoindoline is obtained, M.P. 203–205° (after recrystallisation), and on using N.N-diethyl-ethylenediamine, 1-oxo-2-ethyl-3-(3'-sulphamyl-4' - chlorophenyl) - 3 - ($\beta$-diethylamino-ethylamino)-isoindoline is obtained, M.P. 209° (on decomposition).

In a third aspect of the invention, it relates to isoindoline derivatives of the general formula

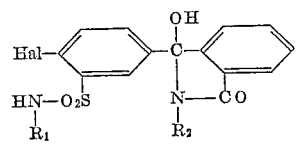

XIV wherein
Hal represents a chlorine atom,
$R_1$ represents a lower alkyl group and
$R_2$ reprsents hydrogen or a lower alkyl group.

These isoindoline derivatives of the general Formula XIV have excellent diuretic and saluretic activity and also reduce blood pressure. The proportion of ions excreted is very favourable as the amount of potassium ions excreted is very slight in comparison to that of sodium ions. On the other hand, the great excretion of sodium ions corresponds to a great excretion of chlorine ions and of water. In contrast to corresponding compounds having an unsubstituted sulphamyl group at the nitrogen atom in the phenyl substituent, the diuretics according to general Formula XIV do not inhibit carbonic anhydrase and thus cause no alterations in the acid-base equilibrium in the human body.

Of the isoindoline derivatives of general formula, those are particularly preferred in the general Formula XIV of which Hal represents chlorine, $R_1$ is the methyl radical and $R_2$ is hydrogen or the methyl radical.

To produce the compounds of general Formula XIV, a compound of the general formula

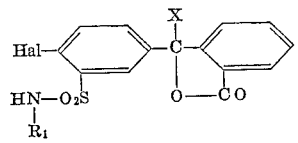

XV

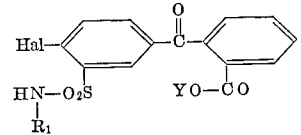

XVI wherein
X represents chlorine or bromine,
Y represents hydrogen or a low molecular alkyl radical, and
$R_1$ and Hal have the meanings given above,
is reacted with a compound of the general formula

$R_2$—$NH_2$    XVII wherein $R_2$ has the meaning given above; or a compound of the general formula

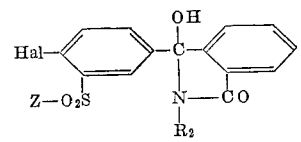

XVIII wherein Z represents chlorine or bromine and Hal and $R_2$ have the meanings given above, is reacted with a compound of the general formula

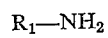

$R_1$—$NH_2$    XIX the reaction being performed in the presence of acid binding agents, e.g. in excess amine of the Formula XIX.

A particular method of performing the two alternative processes for the production of compounds in which $R_2$ represents the same low molecular alkyl group as $R_1$, consists in reacting a compound of the general formula

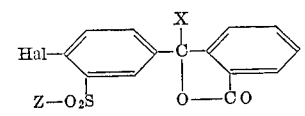

XX

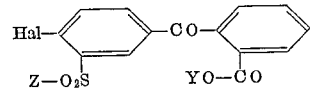

XXI wherein Hal, X, Y and Z have the meanings given above, with at least double the molar amount of an amine of the general Formula XIX, the reaction being performed advantageously in the presence of acid binding agents, e.g. of excess amine. In this reaction one of the starting materials of the general Formulae XVI and XVIII occurs as intermediate product; if the reactivity of the two groups reacting is similar then possibly the corresponding compounds of the general Formulae XVI and XVIII can also occur together as intermediate products.

Starting materials of the general Formula XXI are obtained on the one hand starting from halogen benzenes and on the other from phthalic acid anhydrides or phthalic acid ester halides. By condensing such reaction components according to Friedel-Crafts, 4'-halogen-2-carboxybenzophenones are obtained which can be nitrated in the 3'-position. The sulphohalides of the general Formula XXI are obtained by reducing the 4'-halogen-3'-nitro-2-carboxybenzophenones, diazotising the 3-amino compounds obtained and decomposing the diazonium halides with sulphur dioxide in the presence of copper salts such as cuprous chloride or cuprous bromide. If the sulphohalides of the general Formula XXI are reacted with ammonia or with a low molecular alkylamine under relatively mild reaction conditions, then starting materials of the general Formula XVI are obtained which, in their turn, can be converted into halogen lactones as starting materials of the general Formula XV by treatment with mineral acid halides, e.g. thionyl chloride, phosphorus oxychloride, phosphorus pentachloride, or phosphorus tribromide. However, the sulphohalides of the general Formula XXI can also be converted into halogen lactones of the general Formula XX by treatment with mineral acid halides. Finally, starting materials of the general Formula XVIII are obtained by nitrating 1-oxo-3-(p-halogen-phenyl)-3-hydroxy - isoindolines, reducing the nitration product, diazotising the amino compounds and treating the diazonium salts with sulphur dioxide in the presence of copper chloride or copper bromide.

The following compounds are given as examples of starting materials of the general Formulae XV, XVI or XVIII:

3-chloro-3-(3'-methylsulphamyl-4'-chlorophenyl)-phthalide,
3-chloro-3-(3'-ethylsulphamyl-4'-chlorophenyl)-phthalide,
3'-n-butylsulphamyl-4'-chlorobenzophenone-2-carboxylic acid,
3'-ethylsulphamyl-4'-chlorobenzophenone-2-carboxylic acid ethyl ester,
1-oxo-3-hydroxy-3-(3'-chlorosulphonyl-4'-chlorophenyl)-isoindoline,
1-oxo-3-hydroxy-3-(3'-bromosulphonyl-4'-chlorophenyl)-isoindoline,
1-oxo-2-methyl-3-hydroxy-3-(3'-chlorosulphonyl-4'-chlorophenyl)-isoindoline,
1-oxo-2-ethyl-3-hydroxy-3-(3'-chlorosulphonyl-4'-chlorophenyl)-isoindoline,
1-oxo-2-n-butyl-3-hydroxy-3-(3'-chlorosulphonyl-4'-chlorophenyl)-isoindoline,
3-chloro-3-(3'-chlorosulphonyl-4'-chlorophenyl)-phthalide,
3-bromo-3-(3'-bromosulphonyl-4'-chlorophenyl)-phthalide,
3'-chlorosulphonyl-4'-chlorobenzophenone-2-carboxylic acid.

In addition to ammonia, for example, methylamine, ethylamine, n-propylamine, isopropylamine, n-butylamine, isobutylamine, n-amylamine, isoamylamine can be used as starting materials of the general Formula XVII and the low molecular alkylamines given above can be used as starting materials of the general Formula XIX.

The compounds of Formula XIV according to the present invention have good solubility in lipoids, only slight toxicity and a long-lasting action. They are well tolerated and can be used, for example, for the treatment of oedema of any origin such as cardiac, hepatic, renal, static or trophic origin in man, and are administered orally in dosages of 1 mg./kg. to 10 mg./kg. bodyweight daily.

The following examples illustrate the production of the new isoindoline derivatives of general Formula XIV without limiting this third aspect of the invention in any way. Parts are given as parts by weight and their relationship to parts by volume is as that of grammes to cubic centimetres. The temperatures are in degrees centigrade.

*Example 7*

37.7 parts of 3-(3'-chlorosulphonyl-4'-chlorophenyl)-3-chlorophthalide, which can be easily produced by boiling 3'-chlorosulphonyl-4'-chlorobenzophenone-2-carboxylic acid with five times the amount by weight of thionyl chloride for 1 hour and then distilling off the excess, are added within 15 minutes at 20–30° to a mixture of 50 parts by volume of dioxan and 50 parts by volume of 40% aqueous methylamine solution. To complete the reaction, the whole is heated to 70°. After cooling, the 1-oxo-2-methyl-3-(3'-methylsulphamyl - 4'-chlorophenyl)-3-hydroxy-isoindoline which crystallises out is filtered off and recrystallised from dioxan. M.P. 251–253°.

1-oxo-2-ethyl-3-(3'-ethylsulphamyl - 4' - chlorophenyl)-3-hydroxy-isoindoline (M.P. 224–227°) is obtained from ethylamine in the same way or, on using n-propylamine, 1-oxo-2-n-propyl-3-(3' - n - propylsulphamyl - 4' - chlorophenyl)-3-hydroxy-isoindoline is obtained in the same manner. M.P. 232°.

The 3'-chlorosulphonyl-4'-chlorobenzophenone-2 - carboxylic acid necessary as starting material can be produced as follows:

15 parts of aqueous 46% sodium nitrite solution are slowly added at 0–10° to a mixture of 27.5 parts of 4'-chloro-3'-aminobenzophenone-2-carboxylic acid, 200 parts of glacial acetic acid and 20 parts of 37% hydrochloric acid. The solution of the diazonium salt is poured into an ice-cooled mixture of 200 parts of 30% sulphur dioxide solution in glacial acetic acid and 3 parts of crystallised cupric chloride in 15 parts of water. Nitrogen is developed and, after a short time, the 3'-chlorosulphonyl-4'-chlorobenzophenone-2-carboxylic acid crystallises out. After one hour it is filtered off and washed with water. M.P. 178–182°.

*Example 8*

35.9 parts of 3'-chlorosulphonyl-4'-chlorobenzophenone-2-carboxylic acid are dissolved in 100 parts by volume of chloroform and the solution is poured into a mixture of 100 parts by volume of aqueous 35% methylamine solution and 150 parts by volume of alcohol. After standing for 2 hours at 30°, the reaction mixture is concentrated to half its volume and acidified with hydrochloric acid. The crude product, which is amorphous, is kneaded with water and then gradually crystallises. After recrystallising from ethyl acetate, 3'-methylsulphamyl-4'-chlorobenzophenone-2-carboxylic acid is obtained, M.P. 186–188°.

35.4 parts of 3'-methylsulphamyl-4'-chlorobenzophenone-2-carboxylic acid are boiled for 30 minutes with 500 parts by volume of thionyl chloride and the excess of the latter is then removed in the vacuum. In this way crude 3-(3' - methylsulphamyl-4'-chlorophenyl)-3-chlorophthalide is obtained. It is amorphous and is further worked up as follows. 300 parts of concentrated aqueous ammonia solution are poured over the raw product whereupon the 1-oxo-3-(3'-methylsulphamyl-4'-chlorophenyl)-3-hydroxy-isoindoline immediately crystallises out under slight heating. M.P. 220–223° on decomposition (recrystallised from aqueous acetone).

*Example 9*

35.4 parts of 3'-methylsulphamyl-4'-chlorobenzophenone-2-carboxylic acid are converted with thionyl chloride into 3-(3'-methylsulphamyl-4'-chlorophenyl)-3-chlorophthalide according to Example 8. 300 parts by volume of ethanol are poured over the latter and the whole is refluxed for 15 minutes whereupon a solution of 3'-methylsulphamyl-4'-chlorobenzophenone-2-carboxylic acid ethyl ester forms. The solution is concentrated to 100 parts by volume, saturated with ammonia gas at 0° and then heated in a pressure vessel for 6 hours at 120°. After cooling, the liquid components are removed in the vacuum and the 1-oxo-3-(3'-methylsulphamyl-4'-chlorophenyl)-3-hydroxy-isoindoline which precipitates is recrystallised from dioxan. M.P. 220–223°.

*Example 10*

36.8 parts of 3'-methylsulphamyl-4'-chlorobenzophenone-2-carboxylic acid methyl ester are heated in an autoclave for 8 hours at 80–100° with 100 parts of 25% ammonia and 100 parts of alcohol. After cooling, the alcohol and excess ammonia are distilled off and the crude product which at first is in a greasy form, is purified by thoroughly washing with water and then recrystallising from 50% acetic acid. In this way, 1-oxo-3-(3'-methylsulphamyl - 4' - chlorophenyl) - 3 - hydroxy-isoindoline are obtained; M.P. 220–223°.

*Example 11*

17 parts of 1-oxo-2-methyl-3-(3'-chlorosulphonyl-4'-chlorophenyl)-3-hydroxy-isoindoline are dissolved in 100 parts of chloroform. A mixture of 50 parts of 40% aqueous methylamine solution and 50 parts of ethanol is then added dropwise within 20 minutes at about 10° while stirring and cooling and the whole is then stirred for 1 hour at 40°. The solvent is then distilled off in vacuo and dilute hydrochloric acid is added to the residue. The precipitated crude product is filtered off and recrystallised from dioxan whereupon 1-oxo-2-methyl-3-(3'-methylsulphamyl-4'-chlorophenyl)-3-hydroxy-isoindoline is obtained which melts at 251–253°.

1-oxo - 3 - (3' - methylsulphamyl - 4' - chlorophenyl)-3-hydroxy-isoindoline (M.P. 220–223° recrystallised from dioxan) and 1-oxo-2-ethyl-3-(3'-ethylsulphamyl-4'-chlorophenyl)-3-hydroxy-isoindoline (M.P. 224–227° recrystallised from dioxan) can be obtained, for example, in an analogous manner.

The present application is a continuation-in-part of our applications Serial No. 770,946, filed October 31, 1958 (now abandoned) Serial No. 795,616, filed February 26, 1959 (now abandoned), Serial No. 25,510, filed April 29, 1960 (now abandoned), and Serial No. 31,547, filed May 25, 1960 (forfeited since the filing of the present application).

What we claim is:

1. A compound of the formula

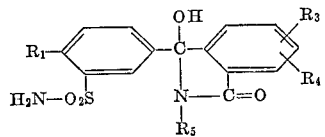

wherein $R_1$ represents a member selected from the group consisting of chlorine, bromine, $NH_2$, lower alkyl and lower alkoxy, $R_3$ represents a member selected from the group consisting of hydrogen, chlorine, bromine, nitro, hydroxy, lower alkyl, —COOH,

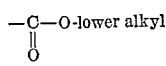

—O-(lower alkylene)-COOH, —$NH_2$, lower alkoxy, lower alkanoylamino,

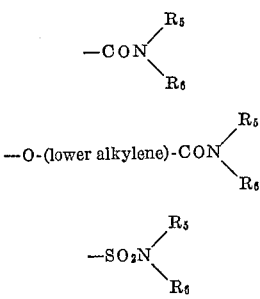

$R_4$ represents a member selected from the group consisting of hydrogen, chlorine, bromine, lower alkyl and lower alkoxy, $R_5$ as substituent at the nitrogen atom of the isoindoline ring, represents a member selected from the group consisting of hydrogen, lower alkyl, lower alkenyl, lower hydroxyalkyl and cyclohexyl, and each of $R_5$ and $R_6$ taken separately as constituents of $R_3$ represents a member selected from the group consisting of hydrogen, lower alkyl, lower alkenyl, lower hydroxyalkyl and $R_5$ and $R_6$ jointly with the corresponding nitrogen atom represent a member selected from the group consisting of pyrrolidino, piperidino and morpholino.

2. A compound of the formula

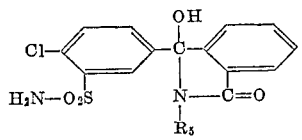

wherein $R_5$ is lower alkyl.

3. 1 - oxo - 3 - (3' - sulphamyl - 4' - chloro - phenyl) - 3 - hydroxy - isoindoline.

4. 1 - oxo - 2 - methyl - 3 - (3' - sulphamyl - 4' - chlorophenyl) - 3 - hydroxy - isoindoline.

5. 1 - oxo - 2 - ethyl - 3 - (3' - sulphamyl - 4' - chlorophenyl) - 3 - hydroxy - isoindoline.

6. 1 - oxo - 2 - n - butyl - 3 - (3' - sulphamyl - 4' - chloro - phenyl) - 3 - hydroxy - isoindoline.

7. 1 - oxo - 2 - cyclohexyl - 3 - (3' - sulphamyl - 4'-chloro - phenyl) - 3 - hydroxy - isoindoline.

8. A compound of the formula

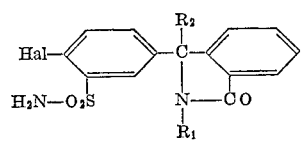

wherein

Hal represents chlorine, $R_1$ represents a member selected from the group consisting of hydrogen and lower alkyl, and $R_2$ represents a member selected from the group consisting of an alkoxy with 1–6 carbon atoms, lower alkylamino, lower dialkylamino, lower dialkylaminoalkylamino and piperidino.

9. 1 - oxo - 3 - (3' - sulphamyl - 4' - chlorophenyl)-3-methoxy-isoindoline.

10. 1 - oxo - 3 - (3' - sulphamyl - 4' - chlorophenyl)-3-ethoxy-isoindoline.

11. 1 - oxo - 3 - (3' - sulphamyl - 4' - chlorophenyl)-3-n-butoxy-isoindoline.

12. 1 - oxo - 2 - ethyl - 3 - (3' - sulphamyl - 4'-chlorophenyl)-3-ethoxy-isoindoline.

13. 1 - oxo - 2 - ethyl - 3 - (3' - sulphamyl - 4'-chlorophenyl)-3-n-hexyloxy-isoindoline.

14. 1 - oxo - 3 - (3' - sulphamyl - 4' - chlorophenyl)-3-piperidino-isoindoline.

15. 1 - oxo - 3 - (3' - sulphamyl - 4' - chlorophenyl)-3-n-propylamino-isoindoline.

16. 1 - oxo - 2 - ethyl - 3 - (3' - sulphamyl - 4'-chlorophenyl)-3-n-butylamino-isoindoline.

17. 1 - oxo - 2 - ethyl - 3 - (3' - sulphamyl - 4'-chlorophenyl)-3-diethylamino-isoindoline.

18. 1 - oxo - 2 - ethyl - 3 - (3' - sulphamyl - 4'-chlorophenyl)-3-(β-diethylaminoethylamino)-isoindoline.

19. A compound of the formula

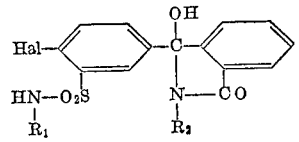

wherein Hal represents chlorine, $R_1$ represents lower alkyl, $R_2$ represents a member selected from the group consisting of hydrogen and lower alkyl.

20. 1-oxo-3-(3'-methylsulphamyl-4'-chlorophenyl)-3-hydroxy-isoindoline.
21. 1-oxo-2-methyl-3-(3'-methylsulphamyl-4'-chlorophenyl)-3-hydroxy-isoindoline.
22. 1-oxo-2-ethyl-3-(3'-ethylsulphamyl-4'-chlorophenyl)-3-hydroxy-isoindoline.
23. 1-oxo-2-n-propyl-3-(3'-n-propylsulphamyl-4'-chlorophenyl)-3-hydroxy-isoindoline.

References Cited in the file of this patent
FOREIGN PATENTS
211,831   Austria _____ Nov. 10, 1960